(12) United States Patent
Cangea et al.

(10) Patent No.: US 11,340,873 B2
(45) Date of Patent: May 24, 2022

(54) CODE CHANGE GRAPH NODE MATCHING WITH MACHINE LEARNING

(71) Applicant: X Development LLC, Mountain View, CA (US)

(72) Inventors: Catalina Codruta Cangea, Mountain View, CA (US); Qianyu Zhang, Sunnyvale, CA (US)

(73) Assignee: X DEVELOPMENT LLC, Mountain View, CA (US)

(*) Notice: Subject to any disclaimer, the term of this patent is extended or adjusted under 35 U.S.C. 154(b) by 167 days.

(21) Appl. No.: 16/946,982

(22) Filed: Jul. 14, 2020

(65) Prior Publication Data

US 2022/0019410 A1    Jan. 20, 2022

(51) Int. Cl.
*G06N 20/00* (2019.01)
*G06F 8/33* (2018.01)
*G06N 5/04* (2006.01)

(52) U.S. Cl.
CPC ............... *G06F 8/33* (2013.01); *G06N 5/04* (2013.01); *G06N 20/00* (2019.01)

(58) Field of Classification Search
CPC ...................................................... G06N 20/00
See application file for complete search history.

(56) References Cited

U.S. PATENT DOCUMENTS

| 10,866,885 | B2 | 12/2020 | Anandh et al. | |
| 10,871,950 | B2 | 12/2020 | De Smet | |
| 2012/0185422 | A1* | 7/2012 | Shah | G06F 16/24558 706/47 |
| 2018/0373986 | A1 | 12/2018 | Rainwater | |
| 2020/0120109 | A1 | 4/2020 | Shu et al. | |
| 2020/0334495 | A1* | 10/2020 | Al-Rfou | G06N 20/20 |
| 2021/0271965 | A1* | 9/2021 | Malynin | G06N 3/0472 |
| 2022/0019410 | A1 | 1/2022 | Cangea et al. | |

OTHER PUBLICATIONS

Stelzer, T. et al.; Automatic generation of tree level helicity amplitudes; Computer Physics Communications 81 3; pp. 357-371; dated 1994.

Ottenstein, K. J. et al.; The program dependence graph in a software development environment; ACM Sigplan Notices 19.5; pp. 177-184; dated 1984.

(Continued)

*Primary Examiner* — Jae U Jeon
(74) *Attorney, Agent, or Firm* — Middleton Reutlinger

(57) ABSTRACT

Implementations are described herein for training and using machine learning to determine mappings between matching nodes of graphs representing predecessor source code snippets and graphs representing successor source code snippets. In various implementations, first and second graphs may be obtained, wherein the first graph represents a predecessor source code snippet and the second graph represents a successor source code snippet. The first graph and the second graph may be applied as inputs across a trained machine learning model to generate node similarity measures between individual nodes of the first graph and nodes of the second graph. Based on the node similarity measures, a mapping may be determined across the first and second graphs between pairs of matching nodes.

20 Claims, 6 Drawing Sheets

(56) References Cited

OTHER PUBLICATIONS

Ferrante, J. et al.; The program dependence graph and its use in optimization; ACM Transactions on Programming Languages and Systems (TOPLAS) 9.3; pp. 319-349; dated 1987.
Chan, P. et al.; A method to evaluate CFG comparison algorithms; 14th International Converence on Quality Software—IEEE; 10 pages; dated 2014.
Deng, J. et al.; A Suitable AST Node Granularity and Multi-Kernel Transfer Convolutional Neural Network for Cross-Project Defect Prediction; IEEE Access; 15 pages; dated 2020.
Mou, L. et al.; Building program vector representations for deep learning; Sorftware Institute; 11 pages; dated 2014.
Phan, A. et al.; Convolutional Neural Networks over Control Flow Graphs for Software Defect Prediction; Japan Advanced Institute of Information Technology; 8 pages; dated 2018.
Wang, W. et al.; Detecting Code Clones with Graph Neural Network and Flow-Augmented Abstract Syntax Tree; IEEE; 11 pages; dated 2020.
Jiang, B. et al.; GLMNet Graph Learning-Matching Networks for Feature Matching; Computer Science and Technology; 8 pages; dated 2019.
Li, Y. et al.; Graph Matching Networks for Learning the Similarity of Graph Structured Objects; 18 pages; dated May 2019.
Ling, X. et al.; Hierarchical graph matching networks for deep graph similarity learning; ICLR; 18 pages; dated 2020.

* cited by examiner

CODE CHANGE GRAPH NODE MATCHING WITH MACHINE LEARNING

BACKGROUND

One way to identify changes made to a piece or "snippet" of source code is to generate graphs that represent the source code snippet before and after editing. These graphs may represent what will be referred to herein as "predecessor" and "successor" source code snippets. The predecessor source code snippet may be the source code snippet of interest prior to some changes being made to it, and may be represented by a first graph. The successor source code snippet may be the same source code snippet after the changes have been made, and may be represented by a second graph. In some cases, a change graph may be determined from the first and second graphs, and may represent the changes made to the source code snippet. Each graph may take various forms, such as an abstract syntax tree (AST), a control flow graph (CFG), etc. Heuristics exist to map matching nodes of the (predecessor) first graph to nodes of the second (successor) graph. However, these heuristics tend to be somewhat inaccurate, which in turn can cause downstream operations that rely on the mappings to be inaccurate as well.

SUMMARY

Implementations are described herein for training and using machine learning to determine mappings between matching nodes of graphs representing predecessor source code snippets and graphs representing successor source code snippets. These mappings may then be used for a variety of different purposes, such as to generate a change graph for use as input to other downstream processes. These downstream processes may, for instance, make various predictions related to source code, such as predicting source code changes, predicting code change intents (e.g., change log entries), predicting comments to be embedded into source code, predicting coding mistakes, etc.

In some implementations, these change graphs may be used to train other machine learning models to perform various tasks. For example, with change graphs generated using techniques described herein, a machine learning model may be trained to predict code changes, e.g., to automate at least part of a widespread source code update and/or migration. Mappings between matching nodes determined using techniques described herein may be more accurate than, for instance, similar mappings determined using conventional heuristics. Consequently, downstream tasks that rely on such mappings are improved.

In various implementations, a machine learning model such as a graph matching network (GMN) may be trained to generate a global similarity measure between two input graphs. Once trained, a portion of the machine learning model such as an attention layer may be extracted and used subsequently to determine (e.g., as a signal of) measures of node similarity between individual nodes across pairs of graphs representing predecessor and successor source code snippets. These similarity measures may in turn be used to map matching nodes between the graphs. This mapping may be used for purposes such as generating a change graph.

In some implementations, the plurality of node similarity measures may be based on and/or correspond to attention weights generated by an attention layer of a GMN for pairs of nodes from different graphs. Thus, in some implementations, a portion of the GMN such as the attention layer may be extracted/tapped into and used subsequently to determine these node similarity measures, which in turn can be used to determine mappings across graphs between matching nodes.

Although supervised training of such a machine learning model is possible, labeling individual nodes of graphs as matching individual nodes of other graphs can be time-consuming and/or impractical. Accordingly, in some implementations, the machine learning model may be trained by calculating a first global similarity measure between a first graph and a second graph using an arithmetic formula that uses counts of nodes in the first and second graphs as operands, applying the first graph and the second graph as inputs across a first machine learning model to generate a second global similarity between the first graph and the second graph, and comparing the first and second global similarity measures. Based on the comparison, techniques such as back propagation and gradient descent may be employed to train the machine learning model to optimize towards the first global similarity measure.

In some implementations, various post-processing may be applied to increase the accuracy of node matches determined using the machine learning model. For example, in some implementations, pairs of nodes from first and second graphs that are identified as similar based on output of a GMN may nonetheless be eliminated as potential matches based on the nodes having different types and/or values. As another example, each pair of matching nodes may be further generated based on relative positions of the pair of matching nodes in the first and second graphs. Intuitively, one node from a first graph may be equally similar to two nodes of a second graph. Accordingly, relative positions of the nodes may be taken into consideration to eliminate one of the two nodes of the second graph as a match (e.g., if the node from the first graph is near the top of the first graph, it is more likely to be matched to a node near the top of the second graph, rather than a node near the bottom of the second graph).

In some implementations, a method implemented using one or more processors may include: obtaining first and second graphs, wherein the first graph represents a predecessor source code snippet and the second graph represents a successor source code snippet; applying the first graph and the second graph as inputs across a trained machine learning model to generate node similarity measures between individual nodes of the first graph and nodes of the second graph; and based on the node similarity measures, determining a mapping across the first and second graphs between pairs of matching nodes.

In various implementations, the method may further include generating a change graph based on the mapping, wherein the change graph represents one or more edits made to the predecessor source code snippet to yield the successor source code snippet. In various implementations, the method may further include applying the change graph as input across another machine learning model to generate a prediction associated with the predecessor source code snippet or the successor source code snippet.

In various implementations, the machine learning model comprises a graph matching network (GMN). In various implementations, each node similarity measure of the plurality of node similarity measures is based on an attention weight generated by the GMN for a pair of nodes that includes a node from the first graph and a node from the second graph.

In various implementations, the method may further include eliminating at least some pairs of nodes from the first and second graphs as potential matches based on the at least some pairs of nodes having different types or values. In various implementations, the mapping is further based on relative positions of nodes of each pair of matching nodes within the first and second graphs.

In another aspect, a method implemented by one or more processors may include: obtaining first and second graphs, wherein the first graph represents a predecessor source code snippet and the second graph represents a successor source code snippet; calculating a first global similarity measure between the first graph and the second graph using an arithmetic formula that uses counts of nodes in the first and second graphs as operands; applying the first graph and the second graph as inputs across a first machine learning model to generate a second global similarity measure between the first graph and the second graph; training the first machine learning model based on a comparison of the first and second global similarity measures; and extracting, as a second machine learning model, a portion of the first machine learning model that is applicable to generate a plurality of node similarity measures between individual nodes of the first graph and nodes of the second graph.

In various implementations, the machine learning model comprises a graph matching network (GMN). In various implementations, each node similarity measure of the plurality of node similarity measures is based on an attention weight generated by the GMN for a pair of nodes that includes a node from the first graph and a node from the second graph.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
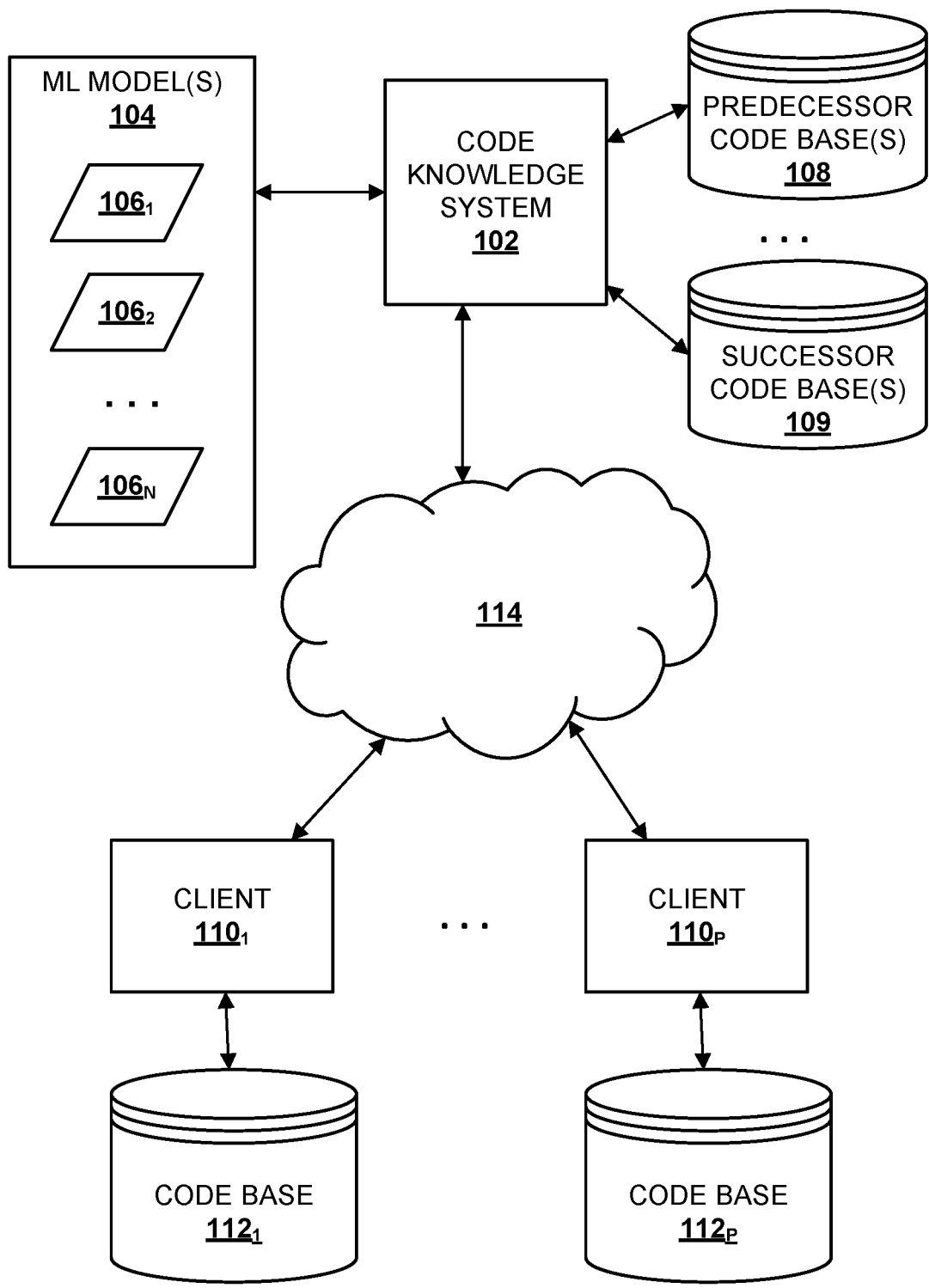
FIG. 1 schematically depicts an example environment in which selected aspects of the present disclosure may be implemented, in accordance with various implementations.

FIG. 1 schematically depicts an example environment in which selected aspects of the present disclosure may be implemented, in accordance with various implementations. Any computing devices depicted in FIG. 1 or elsewhere in the figures may include logic such as one or more microprocessors (e.g., central processing units or "CPUs", graphical processing units or "GPUs") that execute computer-readable instructions stored in memory, or other types of logic such as application-specific integrated circuits (ASIC), field-programmable gate arrays (FPGA), and so forth. Some of the systems depicted in FIG. 1, such as a code knowledge system 102, may be implemented using one or more server computing devices that form what is sometimes referred to as a "cloud infrastructure," although this is not required.

Code knowledge system 102 may be configured to perform selected aspects of the present disclosure in order to help one or more clients $110_{1-P}$ make various inferences based on implemented and/or potential changes to the clients' respective source code bases $112_{1-P}$. For example, code knowledge system 102 may be configured to determine mappings between matching nodes of graphs representing predecessor source code snippets and graphs representing successor source code snippets associated with source code bases $112_{1-P}$ of clients $110_{1-P}$.

These mappings may then be used for a variety of different purposes, such as to generate a change graph for use as input to other downstream source code predictions, such as to predict code change intents (e.g., change log entries), comments to be embedded into source code, identification of coding mistakes, etc. These change graphs can also be used in other contexts to train other types of machine learning models. For example, a machine learning model such as a graph neural network (GNN) may be trained using change graphs generated as described herein to predict code changes, e.g., during a large-scale source code update and/or migration.

Each client 110 may be, for example, an entity or organization such as a business (e.g., financial institute, bank, etc.), non-profit, club, university, government agency, or any other organization that operates one or more software systems. For example, a bank may operate one or more software systems to manage the money under its control, including tracking deposits and withdrawals, tracking loans, tracking investments, and so forth. An airline may operate one or more software systems for booking/canceling/rebooking flight reservations, managing delays or cancelations of flight, managing people associated with flights, such as passengers, air crews, and ground crews, managing airport gates, and so forth.

Many of these entities' code bases 112 may be highly complex, requiring teams of programmers and/or software engineers to perform code base migrations, maintenance, and/or updates. Many of these personnel may be under considerable pressure, and may place low priority on tasks that might be considered "menial" or expendable, such as composing descriptive and/or helpful code change intents, in embedded comments or as part of change list entries. Moreover, a mass code update or migration may require myriad small changes to source code at numerous locations, further challenging these personnel.

Accordingly, code knowledge system 102 may be configured to leverage knowledge of past changes made to source code, such as during code base migration, update, or maintenance events, in order to automate tasks such as composition and/or summarization of code change intents and/or comments, to predict code changes, etc. Many of these tasks may rely on the ability to accurately and quickly identify changes made to source code. Although it is possible to perform text comparisons to determine textual changes between different versions of source code, these textual changes may not convey structure relationships embodied in the source code, e.g., between different logical branches, statements, variables, etc.

Source code—and changes to source code—can also be represented in graph form. For example, source code may be converted into an abstract syntax tree (AST) and/or control flow graph (CFG), either of which may maintain not only the syntax of the code, but also the underlying structure. And a change graph can be generated based on graphs representing a source code snippet before (predecessor) and after (successor) the source code snippet is changed.

Conventional heuristics for determining mappings between matching/corresponding nodes of the predecessor and successor graphs in order to generate a change graph may have limited accuracy. Many of the code changes may be minor, may be relatively hard to discern in similar contexts, and/or may be incomplete and/or semantically incorrect. Accordingly, code knowledge system 102 is configured with selected aspects of the present disclosure to leverage machine learning to more accurately determine mappings between matching/corresponding nodes of predecessor and successor graphs representing predecessor and successor source code snippets.

As noted above, mappings between matching nodes in general, and change graphs generated therefrom in particular, may have a variety of uses. As one example, with change graphs generated using techniques described herein, a machine learning model such as a GNN may be trained to predict code changes, e.g., to automate at least part of a widespread source code update and/or migration. As another example, change graphs generated using techniques described herein may be processed using a machine learning model such as a GNN to automatically predict and/or compose code change intents. Code change intents may be embodied in various forms, such as in change list entries that are sometimes required when an updated source code snippet is committed (e.g., installed, stored, incorporated) into a code base, in comments (e.g., delimited with symbols such as "//" or "#") embedded in the source code, in change logs, or anywhere else where human-composed language indicating an intent behind a source code change might be found.

In either case (predicting code changes or the intents behind them), labeled pairs of predecessor/successor source code snippets may be used to generate corresponding pairs of graphs (e.g., ASTs, CFGs). These graph pairs may be processed with a machine learning model such as a GNN to generate an embedding in vector space. Techniques such as triplet loss may then be used to train the machine learning model based on the embedding's relative proximity in the latent space to other embeddings having similar and dissimilar labels. Labels used for code change prediction and labels used for code change intent prediction may or may not be similar, identical, or entirely different from each other.

Subsequently, to predict a code change, a source code snippet to-be-updated may be converted into graph form and embedded into the vector space using the trained machine model. Various nearest neighbor search algorithms may then be used to identify proximate embeddings that represent previous code changes made during previous migrations.

These previous code changes may be considered as candidate edits for the source code snippet to-be-updated. Similarly, to predict a code change intent, predecessor and successor source code snippets may be converted into graph form and embedded into the same vector space or a different vector space using the trained machine model. Various nearest neighbor search algorithms may then be used to identify proximate embeddings that represent previous code changes made during previous migrations, as well as code change intents behind those changes.

In various implementations, code knowledge system 102 may include a machine learning ("ML" in FIG. 1) database 104 that includes data indicative of one or more trained machine learning models $106_{1-N}$. These machine learning models $106_{1-N}$ may take various forms that will be described in more detail below, including but not limited to a GNN, a GMN, a sequence-to-sequence model such as various flavors of a recurrent neural network (e.g., long short-term memory, or "LSTM", gate recurrent units, or "GRU", etc.) or an encoder-decoder, and any other type of machine learning model that may be applied to facilitate selected aspects of the present disclosure. In some implementations, code knowledge system 102 may also have access to one or more predecessor code bases 108 and successor code bases 109. In some implementations, these predecessor code bases 108 and successor code bases 109 may be used, for instance, to train one or more of the machine learning models $106_{1-N}$.

In various implementations, a client 110 that wishes to take advantage of techniques described herein to, for example, predict and/or implement code changes and/or code change intents when migrating, updating, or even maintaining its code base 112 may establish a relationship with an entity (not depicted in FIG. 1) that hosts code knowledge system 102. In some implementations, code knowledge system 102 may then process all or parts of the client's source code base 112, e.g., by interfacing with the client's software development version control system (not depicted) over one or more networks 114 such as the Internet. Based on this processing, code knowledge system 102 may perform various techniques described herein for predicting and/or utilizing code changes and/or the intents behind them. In other implementations, e.g., where the client's code base 112 is massive, one or more representatives of the entity that hosts code knowledge system 102 may travel to the client's site(s) to perform updates and/or make recommendations.

Figure 2:
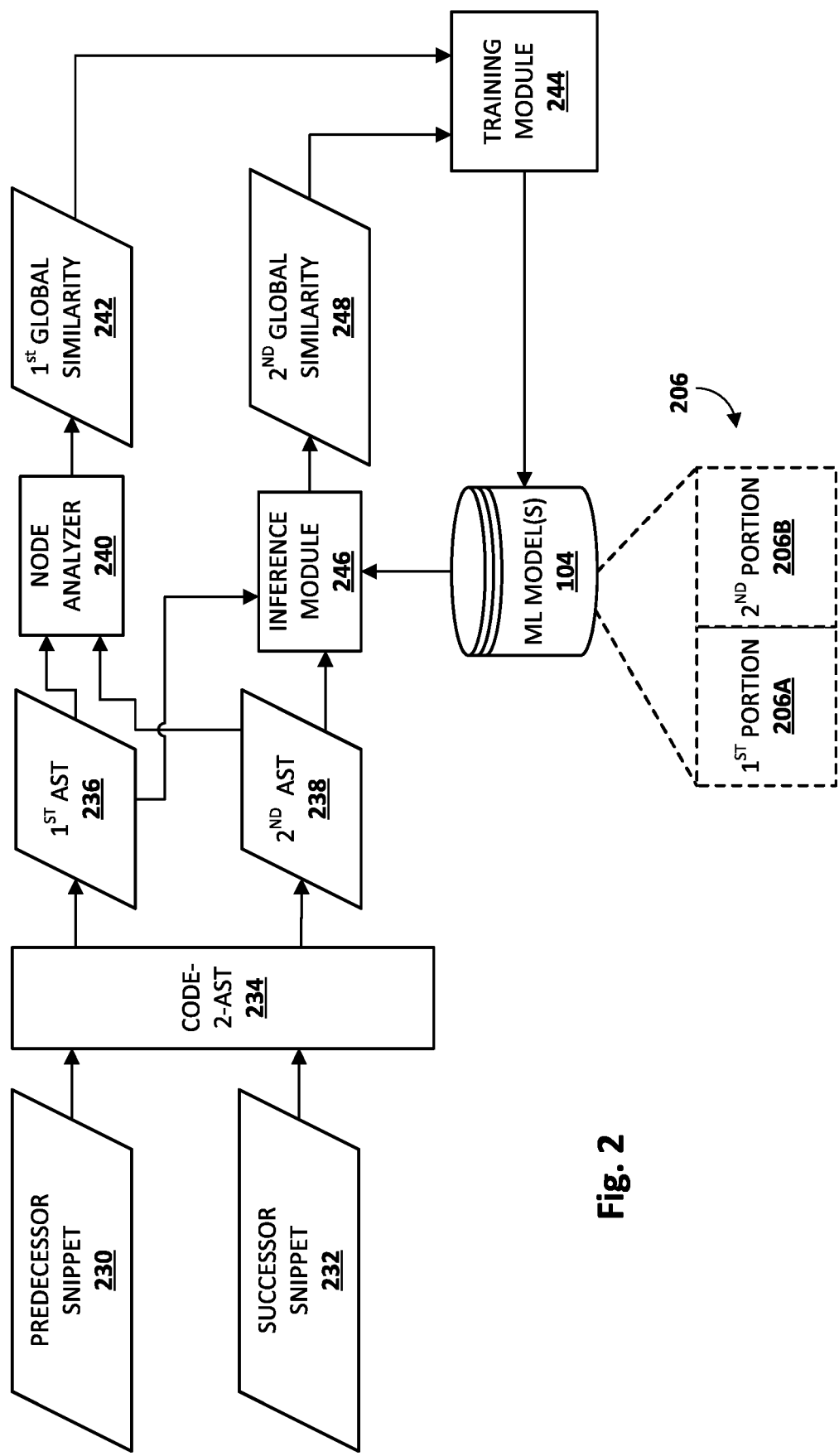
FIG. 2 is a block diagram showing an example of how machine learning models may be trained using techniques described herein, in accordance with various implementations.

FIG. 2 is a block diagram of an example process flow that may be implemented in whole or in part by code knowledge system 102 during training of machine learning models $106_{1-N}$. Various components depicted in FIG. 2 may be implemented by code knowledge system 102 or separately from code knowledge system 102. These components may be implemented using any combination of hardware and computer-readable instructions.

Beginning at the top left, a predecessor source code snippet 230 and a successor source code snippet 232 may be processed by a "code-to-AST" component 234 to generate, respectively, first AST 236 and second AST 238. In other implementations, source code snippets 230-232 may be converted into other types of graphs, such as CFGs.

In a first processing pipeline at top, a node analyzer 240 may analyze first and second ASTs 236-238 to determine a first global similarity measure 242 between them. In some implementations, node analyzer 240 may calculate first global similarity measure 242 using an arithmetic formula that uses counts of nodes in the first and/or second graphs as operands. For example, in some implementations, node analyzer 240 may use the following arithmetic formula to calculate first global similarity measure 242:

$$1\text{st\_sim\_measure}_{global} 242 = \frac{\text{count of nodes in } AST\ 236\ -\ \text{deleted nodes in } AST\ 236}{\text{count of nodes in } AST\ 238}$$

Other arithmetic formulas are contemplated. First global similarity measure 242 may be provided to a training module 244, which will be described shortly.

In a second processing pipeline, first and second ASTs 236-238 may be applied by an inference module 246 as inputs across a machine learning model 206 (e.g., a GMN) to generate a second global similarity measure 248 between first AST 236 and second AST 238. Second global similarity measure 248 may also be provided to training module 244. Training module 244 may then perform a comparison of first and second global similarity measures 242, 248, and may train machine learning model 206 based on the comparison. For example, a difference or "error" between first and second global similarity measures 242, 248 may be used by training module 244 to train machine learning model 206 towards first global similarity measure 242 using techniques such as back propagation and gradient descent.

As indicated in FIG. 2, in some implementations, machine learning model 206 may include multiple portions, such as a first portion 206A and a second portion 206B. In some implementations, one of the first and second portions 206A-B may be extracted as a standalone machine learning model. For example, first portion 206A of machine learning model 206 may be applicable by itself to generate a plurality of node similarity measures between individual nodes of first AST 236 and nodes of second AST 238. This may be true where, for instance, machine learning model 206 is a GMN. With a GMN, each node similarity measure of the plurality of node similarity measures may be based on a cross-graph attention mechanism (e.g., an attention layer) employed by the GMN. The cross-graph attention mechanism (e.g., attention layer) may provide an attention weight (also referred to as an "attention coefficient") for each possible pair of nodes that includes a node from first AST 236 and a node from second AST 238. Thus, in some implementations, first portion 206A of machine learning model 206 that is extracted for subsequent use takes the form of a cross-graph attention mechanism employed as part of a GMN.

Figure 3:
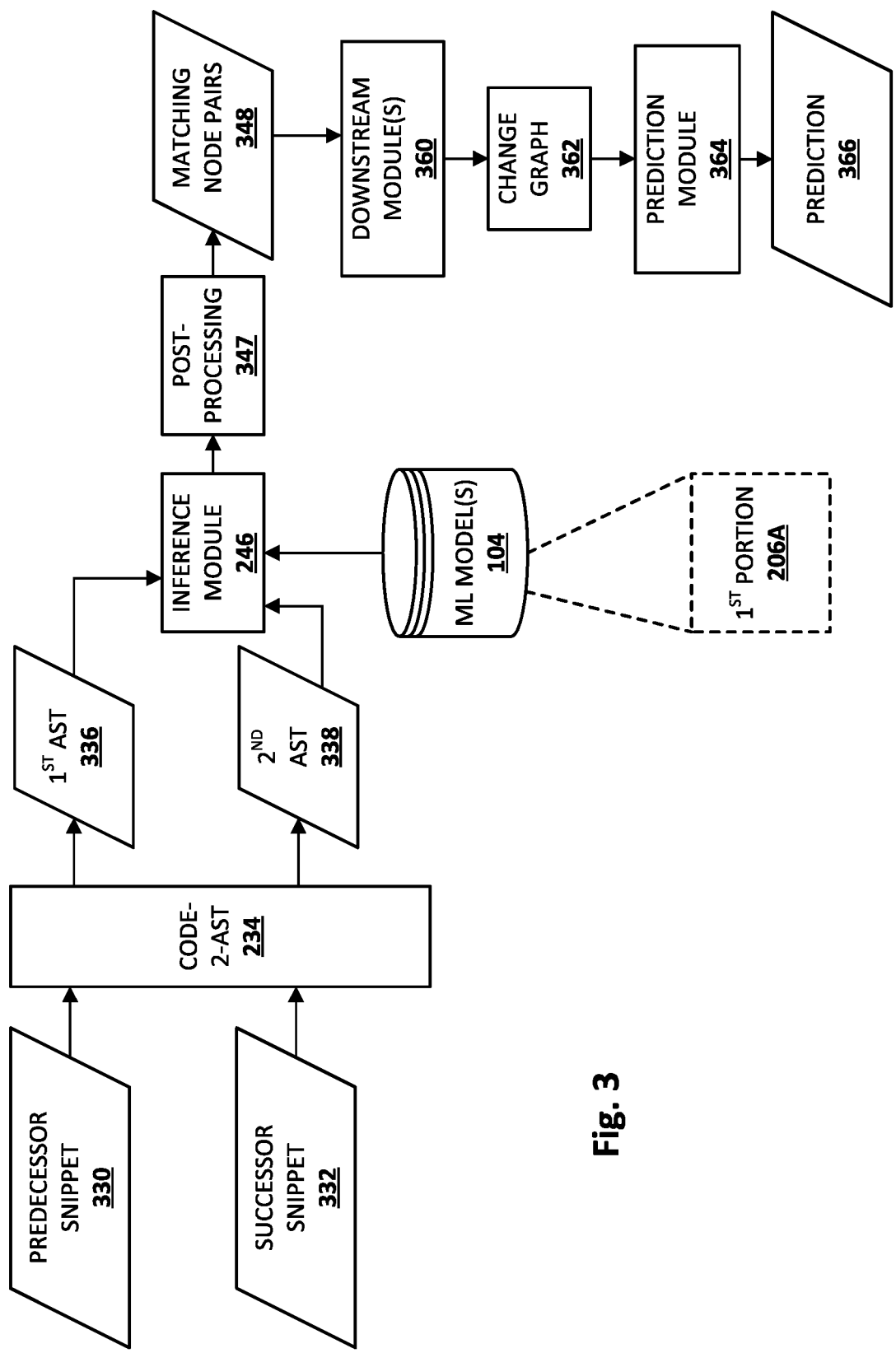
FIG. 3 is a block diagram showing an example of how machine learning models trained using techniques described herein may be used to make inferences, in accordance with various implementations.

FIG. 3 is a block diagram showing an example of how machine learning models trained using techniques described herein may be used to make inferences, in accordance with various implementations. Many of the components of FIG. 3 are similar to those depicted in FIG. 2, with the primary difference being that machine learning model 206 has already been trained so that second global similarity measure 248 (not depicted in FIG. 3, see FIG. 2) now converges towards first global similarity measure 242 (not depicted in FIG. 3, see FIG. 2).

Additionally, first portion 206A of machine learning model 206 has been extracted for use in determining cross-graph matching node pairs 348. It should be understood that when reference is made to first portion 206A being "extracted," this does not necessarily mean that second portion 206B is discarded. For example, in some implementations in which machine learning model 206 is a GMN, inference module 246 may simply tap into the cross-graph attention mechanism (e.g., attention layer) described previously to obtain the attention weights.

Starting once again at top left, a predecessor source code snippet 330 and a successor source code snippet 332 are converted by code-to-AST component 234 into first and second ASTs 336 and 338. ASTs 336-338 are processed by inference module 246, similar to the second pipeline described with respect to FIG. 2. For example, ASTs 336-338 may be processed, e.g., by inference module 246 based on machine learning model 206 (the entire model or just first portion 206A), to generate a plurality of attention weights/ coefficients, which may be considered cross-graph node similarity measures.

It is possible that a single node of one graph (e.g., 336) may be matched to multiple nodes of another graph (e.g., 338). For example, there may be multiple instances of a portion of source code (e.g., a function call, an equation, etc.) across multiple different source code snippets/files. To disambiguate between these multiple matches, in various implementations, post-processing 347 may be performed on the plurality of attention weights/coefficients generated by inference module 246.

In some implementations, post-processing 347 may include eliminating at least some pairs of nodes across first and second ASTs 336-338 as potential matches based on the at least some pairs of nodes having different types or values. For example, two AST nodes may be matched by inference module 246, but if they have different types (e.g., a function that returns an integer versus a function that returns a string, a float variable versus a Boolean variable, etc.). Similarly, if two AST nodes are matched but have different values, they may be eliminated as potential matches.

As another example, post-processing 347 may influence the mapping of matching nodes generated by inference module 246 by considering relative positions of nodes of each pair of matching nodes within the first and second ASTs 236-238. For example, an AST node from near the top of first AST 336 may match two nodes from second AST 338, one near the top of second AST 338 and another closer to the bottom. In some implementations, the latter node of second AST 338 may be eliminated from consideration as a potential match because of its disparate relative position in the graph compared to the node from first AST 336. Put another way, nodes from second AST 338 (i.e. generated from successor source code snippet 332) may be matched to nodes in first AST 336 (i.e. generated from predecessor source code snippet 330) in increasing order of AST index (that is, from the beginning to the end of the code region). An index re-ordering step may be applied in some implementations to fix the crossing of earlier-to-later matches.

From post-processing 347, plurality of matching cross-graph node pairs 348 is generated and may be provided to various downstream module(s) 360 for additional processing. For example, one downstream module 360 may generate a change graph 362. As mentioned previously, change graph 362 may be used for a variety of purposes. For example, in FIG. 3, a prediction module 364 is configured to process change graph 362, e.g., using a machine learning model such as a GNN to make a prediction 366. These predictions may include, for instance, predicted code changes, predicted code change intents, etc.

Figure 4:
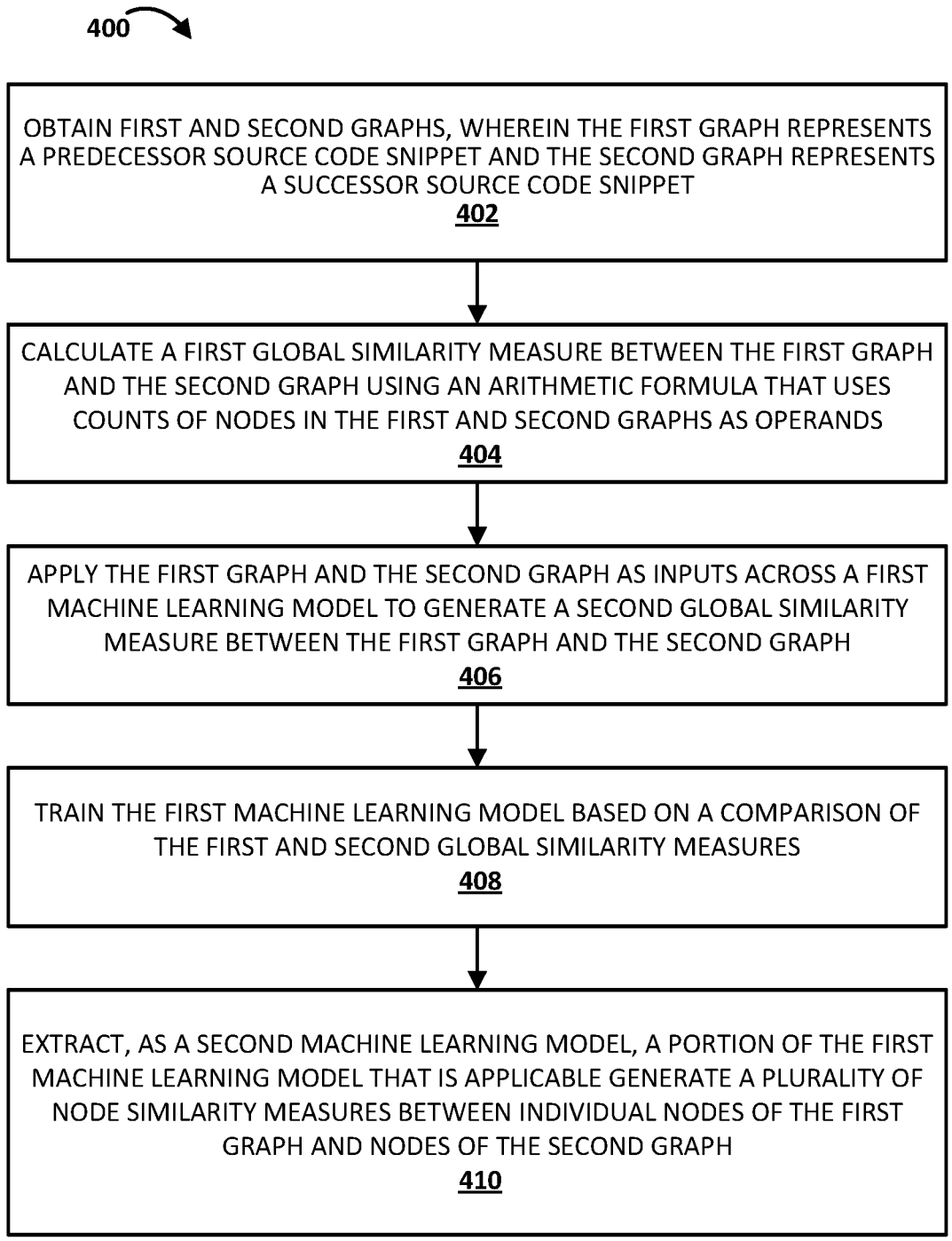
FIG. 4 depicts a flowchart illustrating an example method for training a machine learning model according to implementations disclosed herein.

FIG. 4 is a flowchart illustrating an example method 400 of training a machine learning model such as $106_{1-N}$ in accordance with implementations disclosed herein. For convenience, the operations of the flow chart are described with reference to a system that performs the operations. This system may include various components of various computer systems, such as one or more components of code knowledge system 102. Moreover, while operations of method 400 are shown in a particular order, this is not meant to be limiting. One or more operations may be reordered, omitted or added.

At block 402, the system may obtain first and second graphs. In various implementations, the first graph (e.g., 236) represents a predecessor source code snippet (e.g., 230) and the second graph (e.g., 238) represents a successor source code snippet (e.g., 232). At block 404, the system may calculate a first global similarity measure (e.g., 242) between the first graph and the second graph using an arithmetic formula that uses counts of nodes in the first and second graphs as operands. One non-limiting example of such an arithmetic formula is provided above.

At block 406, which may or may not be performed in parallel with block 404, the system may, e.g., by way of inference module 246, apply the first graph and the second graph as inputs across a first machine learning model (e.g., 206) to generate a second global similarity measure (e.g., 248) between the first graph and the second graph. In implementations, in which the first machine learning model is a GMN, the global similarity measure may represent a distance in vector space between embeddings of the first and second graphs, which may be determined using techniques such as cosine similarity and/or the dot product.

At block 408, the system, e.g., by way of training module 244, may train the first machine learning model based on a comparison of the first and second global similarity measures. For example, a difference or "error" between the two measures 242, 248 may be used to perform training techniques on the GMN such as back propagation and/or gradient descent. At block 410, once the machine learning model is sufficiently trained, the system may extract, as a second standalone machine learning model, a portion (e.g., 206A) of the first machine learning model that is applicable to generate a plurality of node similarity measures between individual nodes of the first graph and nodes of the second graph. For example, this second machine learning model may include (or at least tap into) the cross-graph attention mechanism (e.g., attention layer) of the GMN.

Figure 5:
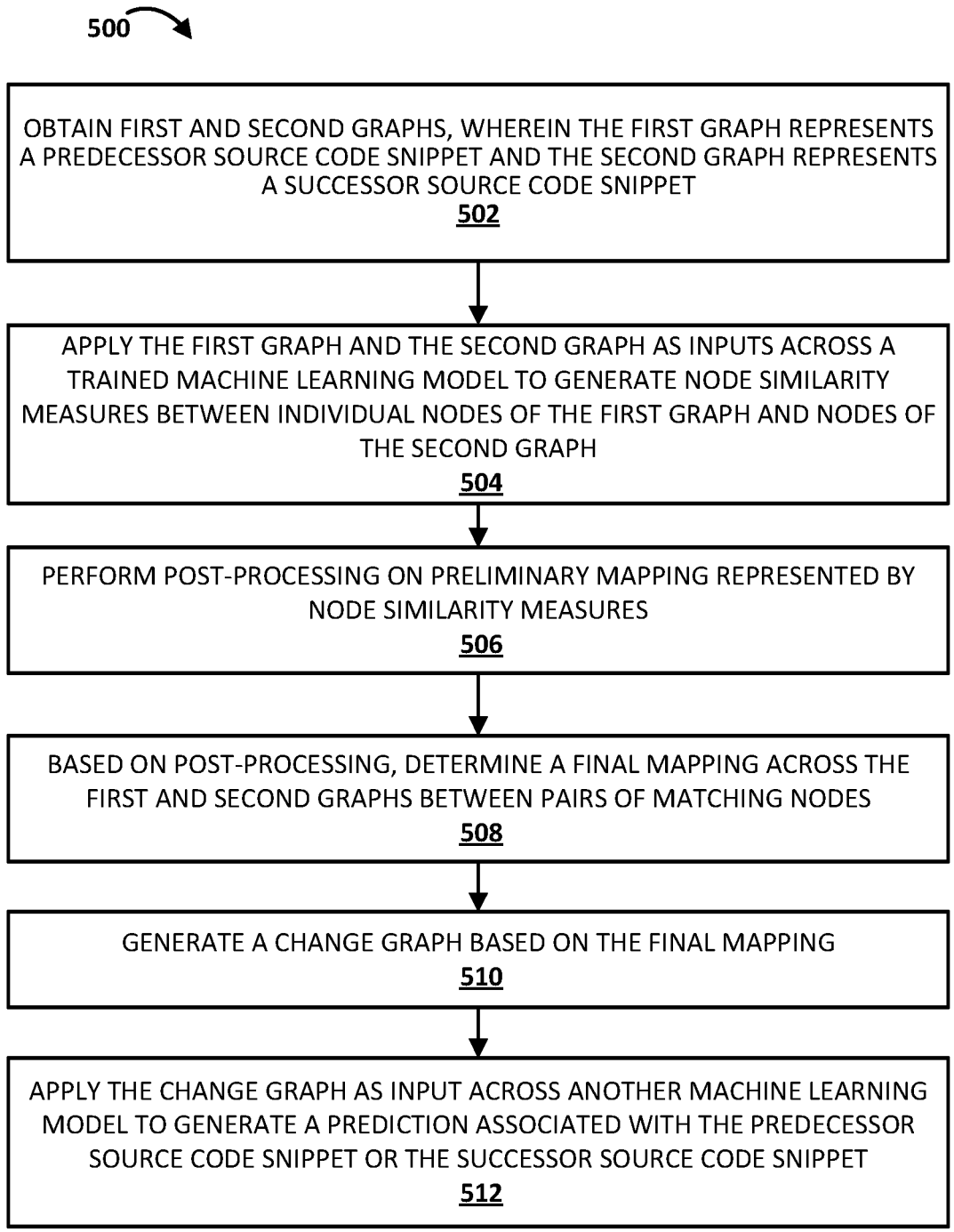
FIG. 5 depicts a flowchart illustrating an example method for applying a machine learning model trained according to implementations disclosed herein.

FIG. 5 is a flowchart illustrating an example method 500 of applying a trained machine learning model such as $106_{1-N}$ in accordance with implementations disclosed herein. For convenience, the operations of the flow chart are described with reference to a system that performs the operations. This system may include various components of various computer systems, such as one or more components of code knowledge system 102. Moreover, while operations of method 500 are shown in a particular order, this is not meant to be limiting. One or more operations may be reordered, omitted or added.

At block 502, the system may obtain first and second graphs (e.g., 336-338), similar to block 402 of FIG. 4. At block 504, the system, e.g., by way of inference module 246, may apply the first graph and the second graph as inputs across a trained machine learning model (e.g., 206A) to generate node similarity measures between individual nodes of the first graph and nodes of the second graph. These similarity measures may be used, for instance, as a representation of a preliminary mapping between nodes of the first and second graphs.

As mentioned previously, this preliminary mapping may map multiple nodes of the successor graph (e.g., 338) to a single node of the predecessor graph (e.g., 336). Accordingly, at block 506, the system may perform post-processing on the preliminarily mapped nodes, as described previously with relation to block 347 of FIG. 3. Based on the post-processed mappings, at block 508, the system may determine a final mapping across the first and second graphs between pairs of matching nodes.

At block 510, the system may generate a change graph based (e.g., 362) on the final mapping. The change graph may represent one or more edits made to the predecessor source code snippet (e.g., 330) to yield the successor source code snippet (e.g., 332). At block 512, the system, e.g., by way of prediction module 364, may apply the change graph as input across another machine learning model (e.g., a GNN) to generate a prediction (e.g., 366) associated with the predecessor source code snippet or the successor source code snippet. As noted previously, this prediction may include a predicted code change or a predicted code change intent, among other things.

Figure 6:
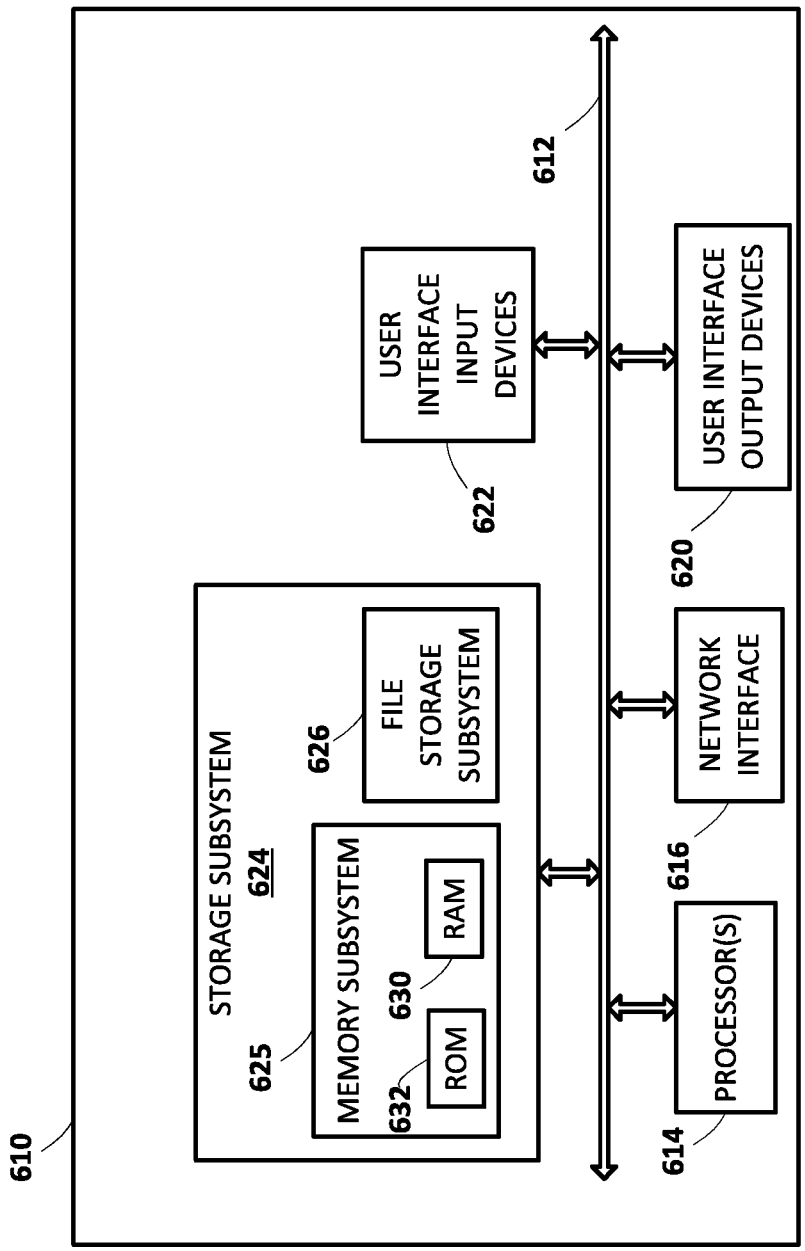
FIG. 6 illustrates an example architecture of a computing device.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the method of FIGS. 4-5, as well as to implement various components depicted in FIGS. 1-2.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges.

The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
   obtaining first and second graphs, wherein the first graph represents a predecessor source code snippet and the second graph represents a successor source code snippet;
   applying the first graph and the second graph as inputs across a trained machine learning model to generate node similarity measures between individual nodes of the first graph and nodes of the second graph; and
   based on the node similarity measures, determining a mapping across the first and second graphs between pairs of matching nodes.

2. The method of claim 1, further comprising generating a change graph based on the mapping, wherein the change graph represents one or more edits made to the predecessor source code snippet to yield the successor source code snippet.

3. The method of claim 2, further comprising applying the change graph as input across another machine learning model to generate a prediction associated with the predecessor source code snippet or the successor source code snippet.

4. The method of claim 1, wherein the machine learning model comprises a graph matching network (GMN).

5. The method of claim 4, wherein each node similarity measure of the node similarity measures is based on an attention weight generated by the GMN for a pair of nodes that includes a node from the first graph and a node from the second graph.

6. The method of claim 1, further comprising eliminating at least some pairs of nodes from the first and second graphs as potential matches based on the at least some pairs of nodes having different types or values.

7. The method of claim 1, wherein the mapping is further based on relative positions of nodes of each pair of matching nodes within the first and second graphs.

8. A method implemented by one or more processors, the method comprising:
   obtaining first and second graphs, wherein the first graph represents a predecessor source code snippet and the second graph represents a successor source code snippet;
   calculating a first global similarity measure between the first graph and the second graph using an arithmetic formula that uses counts of nodes in the first and second graphs as operands;
   applying the first graph and the second graph as inputs across a first machine learning model to generate a second global similarity measure between the first graph and the second graph;
   training the first machine learning model based on a comparison of the first and second global similarity measures; and
   extracting, as a second machine learning model, a portion of the first machine learning model that is applicable to generate a plurality of node similarity measures between individual nodes of the first graph and nodes of the second graph.

9. The method of claim 8, wherein the machine learning model comprises a graph matching network (GMN).

10. The method of claim 9, wherein each node similarity measure of the plurality of node similarity measures is based on an attention weight generated by the GMN for a pair of nodes that includes a node from the first graph and a node from the second graph.

11. A system comprising one or more processors and memory storing instructions that, in response to execution of the instructions by the one or more processors, cause the one or more processors to:
    obtain first and second graphs, wherein the first graph represents a predecessor source code snippet and the second graph represents a successor source code snippet;
    apply the first graph and the second graph as inputs across a trained machine learning model to generate node similarity measures between individual nodes of the first graph and nodes of the second graph; and
    based on the node similarity measures, determine a mapping across the first and second graphs between pairs of matching nodes.

12. The system of claim 11, further comprising instructions to generate a change graph based on the mapping, wherein the change graph represents one or more edits made to the predecessor source code snippet to yield the successor source code snippet.

13. The system of claim 12, further comprising instructions to apply the change graph as input across another machine learning model to generate a prediction associated with the predecessor source code snippet or the successor source code snippet.

14. The system of claim 13, wherein the prediction comprises a change log entry.

15. The system of claim 13, wherein the prediction comprises a comment to be embedding into source code.

16. The system of claim 13, wherein the prediction comprises a coding mistake.

17. The system of claim 11, wherein the machine learning model comprises a graph matching network (GMN).

18. The system of claim 17, wherein each node similarity measure of the node similarity measures is based on an attention weight generated by the GMN for a pair of nodes that includes a node from the first graph and a node from the second graph.

19. The system of claim 11, further comprising eliminating at least some pairs of nodes from the first and second graphs as potential matches based on the at least some pairs of nodes having different types or values.

20. The system of claim 11, wherein the mapping is further based on relative positions of nodes of each pair of matching nodes within the first and second graphs.

* * * * *